United States Patent [19]

Schroeder et al.

[11] Patent Number: 5,615,801
[45] Date of Patent: Apr. 1, 1997

[54] JUICE CONCENTRATE PACKAGE FOR POSTMIX DISPENSER

[75] Inventors: Alfred A. Schroeder; Michael T. Romanyszyn, Jr., both of San Antonio, Tex.; Stephen B. Getsy, Erie, Pa.; Gregg S. Montgomery, West Chester, Ohio; Joseph J. Wolfe, Scottsdale, Ariz.; Norman P. Wittig, Corry, Pa.

[73] Assignee: The Coca-Cola Company, Atlanta, Ga.

[21] Appl. No.: 443,985

[22] Filed: May 18, 1995

Related U.S. Application Data

[60] Continuation-in-part of Ser. No. 178,721, Jan. 10, 1994, Pat. No. 5,494,193, which is a division of Ser. No. 843,757, Feb. 28, 1992, Pat. No. 5,305,923, which is a continuation of Ser. No. 752,406, Aug. 30, 1991, abandoned, which is a continuation-in-part of Ser. No. 634,857, Dec. 27, 1990, abandoned, which is a continuation-in-part of Ser. No. 534,601, Jun. 6, 1990, abandoned, and a continuation-in-part of Ser. No. 715,433, Jun. 14, 1991, abandoned.

[51] Int. Cl.$^6$ .................. B67D 5/22; B67D 5/56
[52] U.S. Cl. .............. 222/51; 222/129.1; 222/145.6; 222/325
[58] Field of Search .................. 222/51, 23, 325, 222/129.1–129.4, 145.1, 145.5, 145.6, 333

[56] References Cited

U.S. PATENT DOCUMENTS

| | | |
|---|---|---|
| 1,757,736 | 5/1930 | Pritchard . |
| 1,828,317 | 10/1931 | Clapp . |
| 1,892,217 | 12/1932 | Moineau . |
| 2,028,407 | 1/1936 | Moineau . |
| 2,517,988 | 8/1950 | Dobkin ................ 222/51 X |

(List continued on next page.)

FOREIGN PATENT DOCUMENTS

| | | |
|---|---|---|
| 0067466 | 12/1982 | European Pat. Off. . |
| 409349 | 1/1991 | European Pat. Off. ........... 222/51 |
| 736119 | 8/1955 | United Kingdom . |
| 9200761 | 11/1992 | WIPO . |

*Primary Examiner*—Kevin P. Shaver
*Attorney, Agent, or Firm*—Thomas R. Boston

[57] ABSTRACT

A disposable and recyclable juice concentrate package for a postmix juice dispenser includes a package housing connected to an integral mixing nozzle. The package housing includes a concentrate container housing sealed to a pump housing. A progressive cavity pump is located in the pump housing for feeding a continuous stream of concentrate to the nozzle for intimately and violently agitating and mixing the water and concentrate and dispensing the beverage. The package also includes a low level indicator and a product identification label.

21 Claims, 6 Drawing Sheets

U.S. PATENT DOCUMENTS

| | | |
|---|---|---|
| 2,532,145 | 11/1950 | Byram . |
| 2,603,162 | 7/1952 | Lloyd . |
| 2,612,845 | 10/1952 | Byram et al. . |
| 2,691,347 | 11/1954 | Zimmer . |
| 2,822,152 | 2/1958 | Knudsen . |
| 2,826,152 | 3/1958 | Michie . |
| 3,366,276 | 1/1968 | Fridley ................................. 222/51 |
| 3,459,337 | 8/1969 | Williamson . |
| 3,528,587 | 9/1970 | Popinski . |
| 3,688,947 | 9/1972 | Reichenberger . |
| 3,830,406 | 8/1974 | Robb ................................. 222/51 X |
| 4,000,833 | 1/1977 | Marks . |
| 4,096,971 | 6/1978 | Kückens . |
| 4,173,296 | 11/1979 | Marshall . |
| 4,194,650 | 3/1980 | Nottke et al. . |
| 4,325,682 | 4/1982 | Willis . |
| 4,515,294 | 5/1985 | Udall . |
| 4,570,823 | 2/1986 | Arabian et al. ................. 222/51 X |
| 4,610,145 | 9/1986 | Arzberger et al. . |
| 4,624,395 | 11/1986 | Baron . |
| 4,667,854 | 5/1987 | McDermott et al. . |
| 4,689,120 | 8/1987 | McMillin . |
| 4,703,770 | 11/1987 | Arberger et al. . |
| 4,708,266 | 11/1987 | Rudick . |
| 4,722,372 | 2/1988 | Hoffman et al. . |
| 4,793,518 | 12/1988 | Burton . |
| 4,818,197 | 4/1989 | Mueller . |
| 4,856,676 | 8/1989 | Emody . |
| 4,860,923 | 8/1989 | Kirschner et al. . |
| 4,875,604 | 10/1989 | Czech . |
| 4,955,509 | 9/1990 | Nevill . |
| 4,979,647 | 12/1990 | Hassell . |
| 4,982,877 | 1/1991 | Burton . |
| 5,031,797 | 7/1991 | Boris et al. . |
| 5,114,047 | 5/1992 | Baron et al. . |
| 5,165,577 | 11/1992 | Ophardt . |
| 5,176,297 | 1/1993 | Mooney et al. . |
| 5,282,552 | 2/1994 | Ophardt . |
| 5,305,923 | 4/1994 | Kirschner . |
| 5,312,017 | 5/1994 | Schroeder et al. . |
| 5,383,581 | 1/1995 | LeMarbe et al. ............. 222/129.1 X |

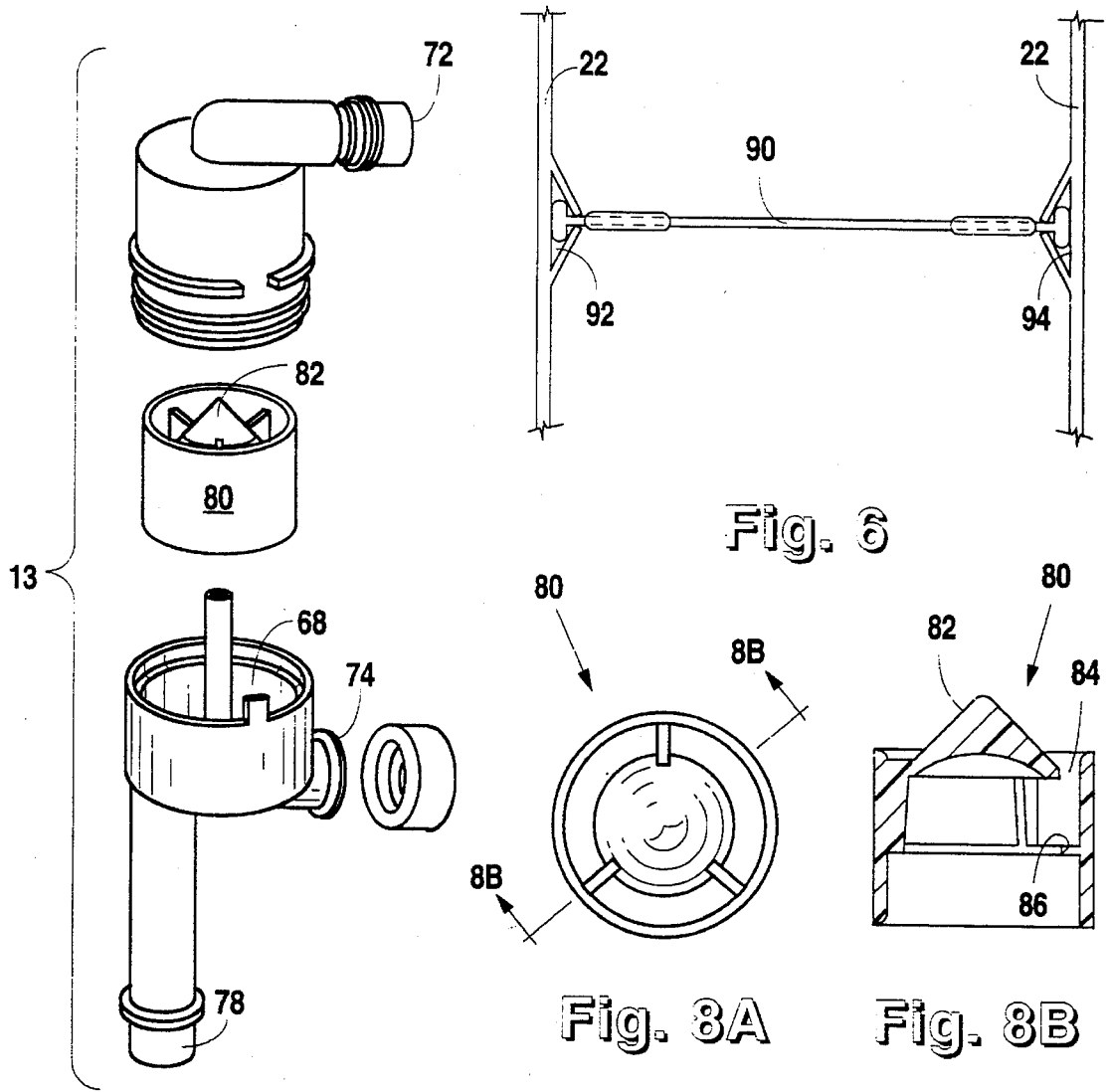
Fig. 8
Fig. 6
Fig. 8A  Fig. 8B
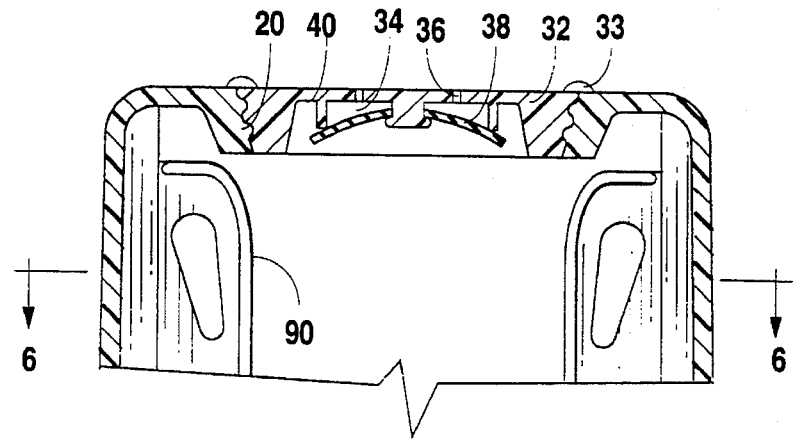
Fig. 7

5,615,801

JUICE CONCENTRATE PACKAGE FOR POSTMIX DISPENSER

CROSS REFERENCE TO RELATED APPLICATIONS

This is a continuation-in-part of U.S. patent application Ser. No. 08/178,721 filed Jan. 10, 1994, (now U.S. Pat. No. 5,494,193) which was a divisional of U.S. patent application Ser. No. 07/843,757 filed Feb. 28, 1992 (now U.S. Pat. No. 5,305,923), which was a continuation of U.S. patent application Ser. No. 07/752,406 filed Aug. 30, 1991 (now abandoned) and having the same title, which was in turn a continuation-in-part of U.S. patent application Ser. No. 07/634,857 filed Dec. 27, 1990 (now abandoned) and having the same title, which was in turn a continuation-in-part of U.S. patent application Ser. No. 07/534,601 filed Jun. 6, 1990 with the same title (now abandoned), and is also a continuation-in-part to U.S. patent application entitled "Progressive Cavity Pump" filed Jun. 14, 1991, Ser. No. 07/715,433 (now abandoned).

BACKGROUND OF THE INVENTION

This invention relates to postmix juice dispensing and in particular to a disposable and recyclable juice concentrate package for insertion into a postmix juice dispenser.

Postmix juice dispensers are known as are disposable and recyclable juice concentrate containers for use therein, which include a juice container, an integral pump (operated by a motor in the dispenser), and a dispense nozzle. Previously the concentrate pump was a part of the dispenser itself; however, to overcome the servicing problem of cleaning the pump, it became the practice to provide the pump (or at least the portion of the pump that contacts the juice—such as the tube of a peristaltic pump) and the dispensing nozzle as part of the disposable concentrate package. The operator then simply needs to remove the package and replace it with a new or different one and proceed to dispense drinks. No cleaning is needed.

One known pump for such a package uses a flexible bellows reciprocating pump which pumps separate independent slugs of concentrate to the mixing chamber.

It is an object of this invention to improve mixing by pumping a continuous stream of concentrate to the mixing chamber.

SUMMARY OF THE INVENTION

A new and improved disposable juice concentrate package includes a package housing and an integral mixing nozzle. The package housing includes a container housing and a pump housing. The pump is a progressive cavity (or moineau) pump that provides a continuous stream of concentrate to the mixing nozzle (in contrast to separate, spaced-apart, shots of concentrate provided by other available types of pumps). This continuous stream is spread into a thin film against which the water is directed, provide for excellent mixing. The package also includes a low level indicator to let the operator know that it is almost time to replace packages, and a product identification (I.D.) label that a dispenser can automatically read and set the correct ratio.

BRIEF DESCRIPTION OF THE DRAWINGS

The present invention will be more fully understood from the detailed description below when read in connection with the accompanying drawings wherein like reference numerals refer to like elements and wherein:

FIG. 6 is a cross-sectional view along line 6—6 of FIG. 7 showing the stiffening rib;

FIG. 7 is a cross-sectional view along line 7—7 of FIG. 3 showing the fill cap and air vent valve thereof;

FIG. 8 is an exploded perspective view of the mixing nozzle;

FIG. 8A is a top view of the mixing element 80;

FIG. 8B is a cross-sectional side view of the mixing element 80, taken along line 8B—8B of FIG. 8A;

DETAILED DESCRIPTION OF THE PREFERRED EMBODIMENT

Figure 1:
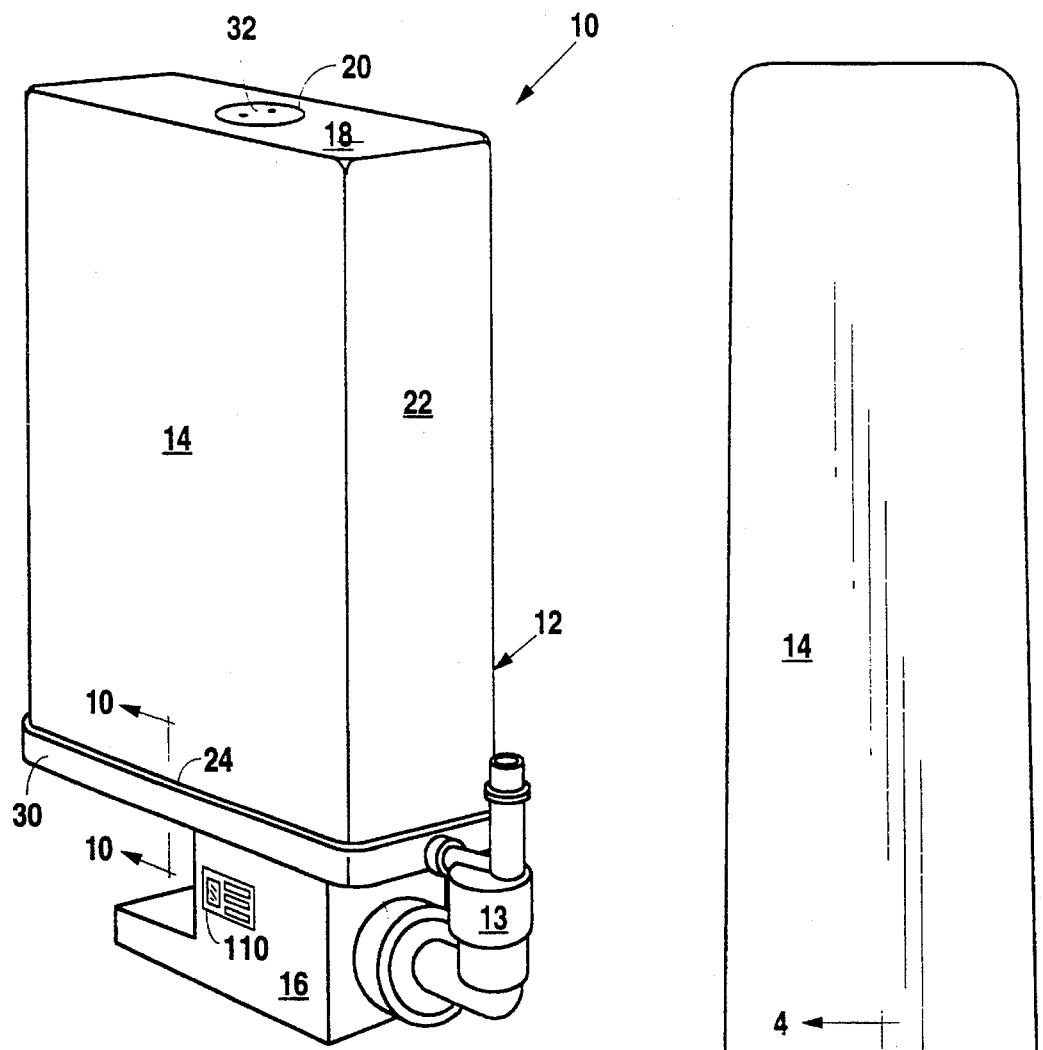
FIG. 1 is a front, top, left side perspective view of the concentrate package of this invention, with the mixing nozzle turned up for shipping.
Figure 2:
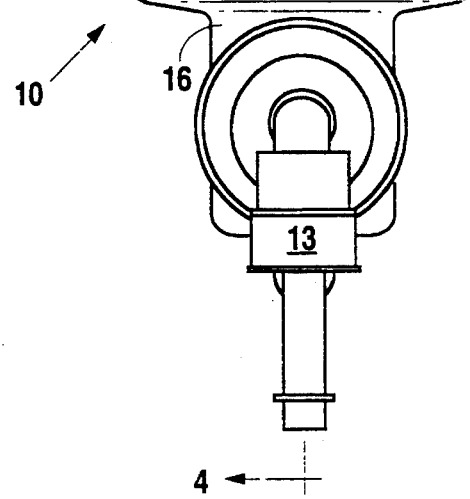
FIG. 2 is a front elevational view of the package of FIG. 1, but with the mixing nozzle rotated down for insertion into a dispenser.
Figure 3:
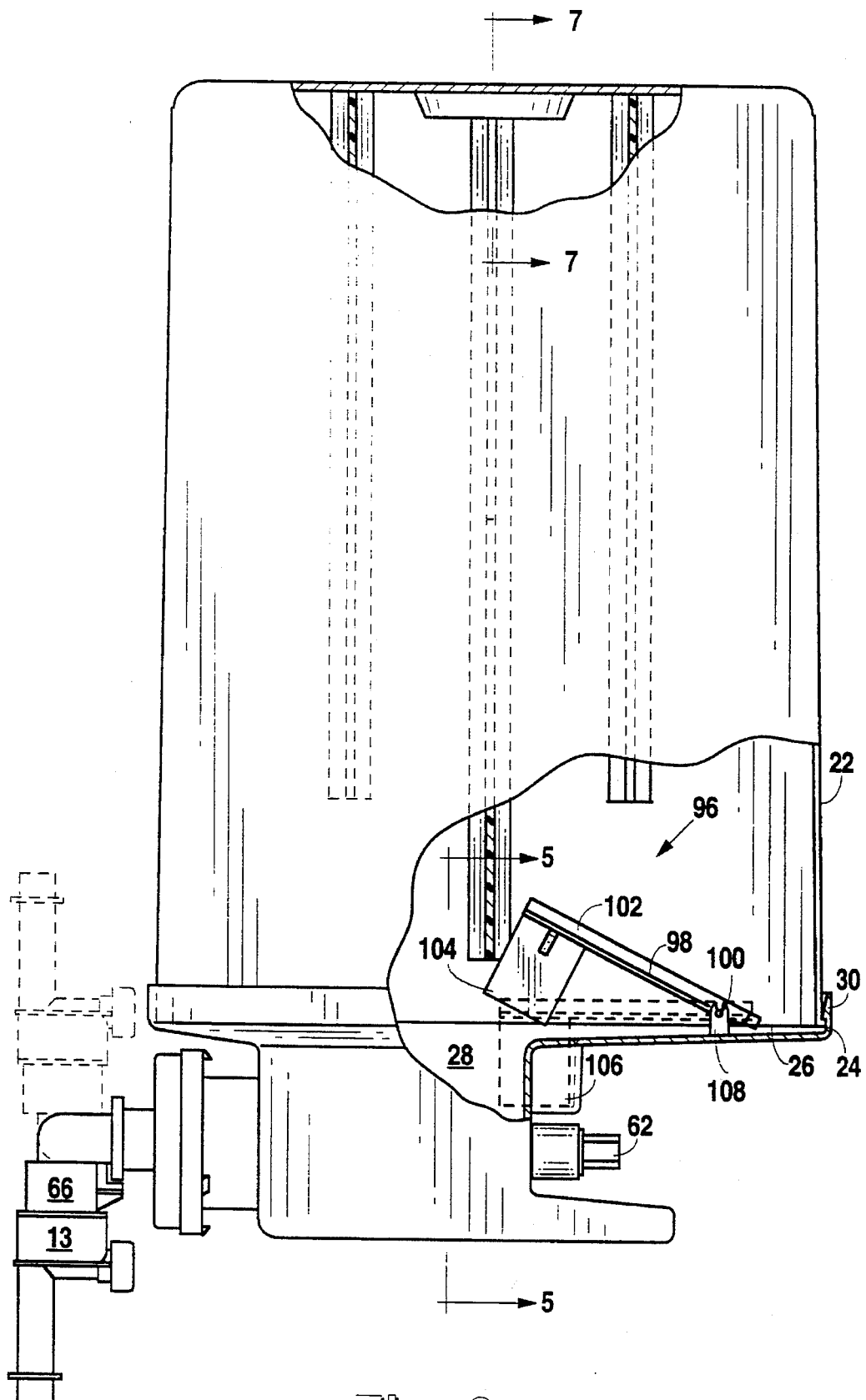
FIG. 3 is a partly cross-sectional, right side elevation view of the package of FIG. 1.
Figure 4:
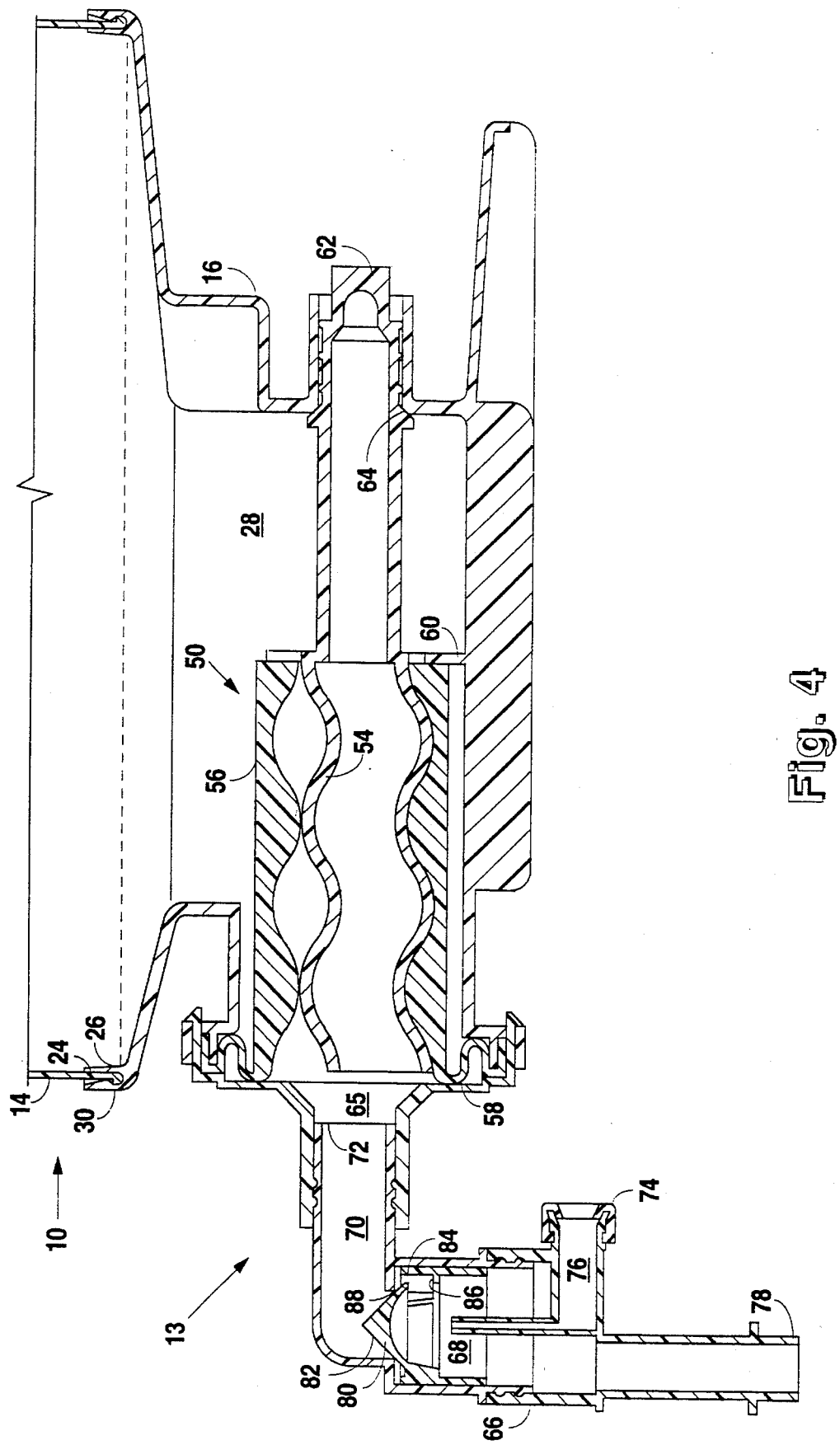
FIG. 4 is a cross-sectional view taken along line 4—4 of FIG. 2 through the lower portion of the package, including the pump and mixing nozzle.
Figure 5:
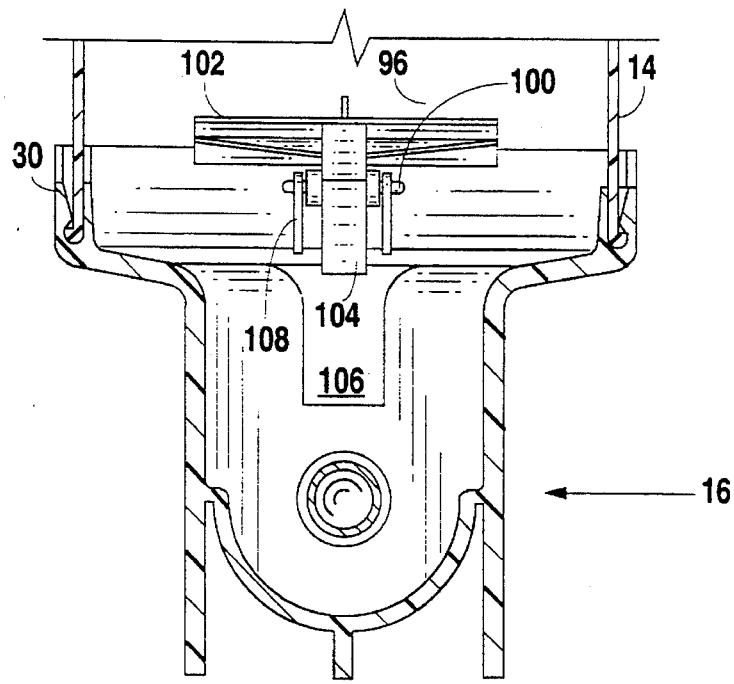
FIG. 5 is a cross-sectional view taken along line 5—5 of FIG. 3 and showing the float.

Referring now to the drawings, FIGS. 1–10 show a concentrate package 10 including a package housing 12 and a mixing nozzle 13. The package housing 12 includes an upper juice concentrate container housing 14 and a lower pump housing 16.

The container housing 14 includes an upper wall 18 having a fill opening 20, and a sidewall 22 having a lower peripheral connecting edge 24 surrounding a container housing bottom opening 26.

The pump housing 16 encloses a pumping chamber 28 and has an upper peripheral attaching edge 30 that mates in a liquid-tight sealing connection with said connecting edge 24.

A fill plug 32 is fitted into said fill opening in a liquid-tight sealing fit. The fill plug can be snap-fit alone or preferably can also be induction welded, spin welded or sonically welded, as at 33, in place. The fill plug includes a one-way air vent valve 34 that prevents egress of liquid but allows air to enter the package as concentrate is pumped out causing reduced air pressure therein. This prevents the package from collapsing. The valve 34 includes a plurality of holes 36, a flexible diaphragm 38 and an annular valve seat 40.

Figure 10:
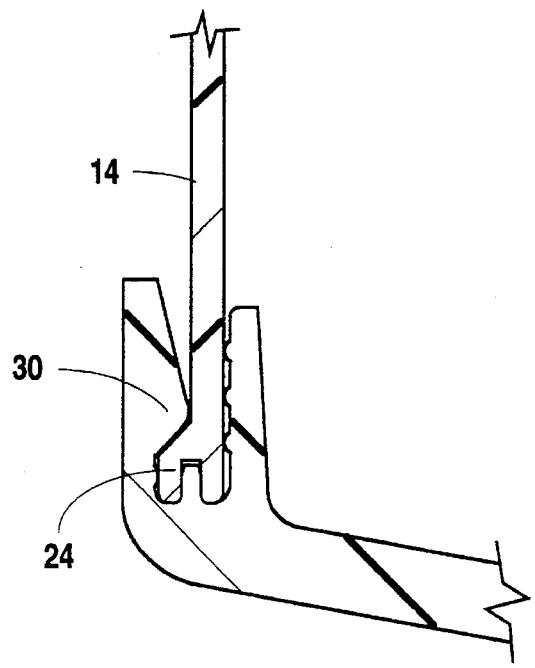
FIG. 10 is an enlarged cross-sectional view through the housings connection, taken along line 10—10 of FIG. 1.
Figure 9:
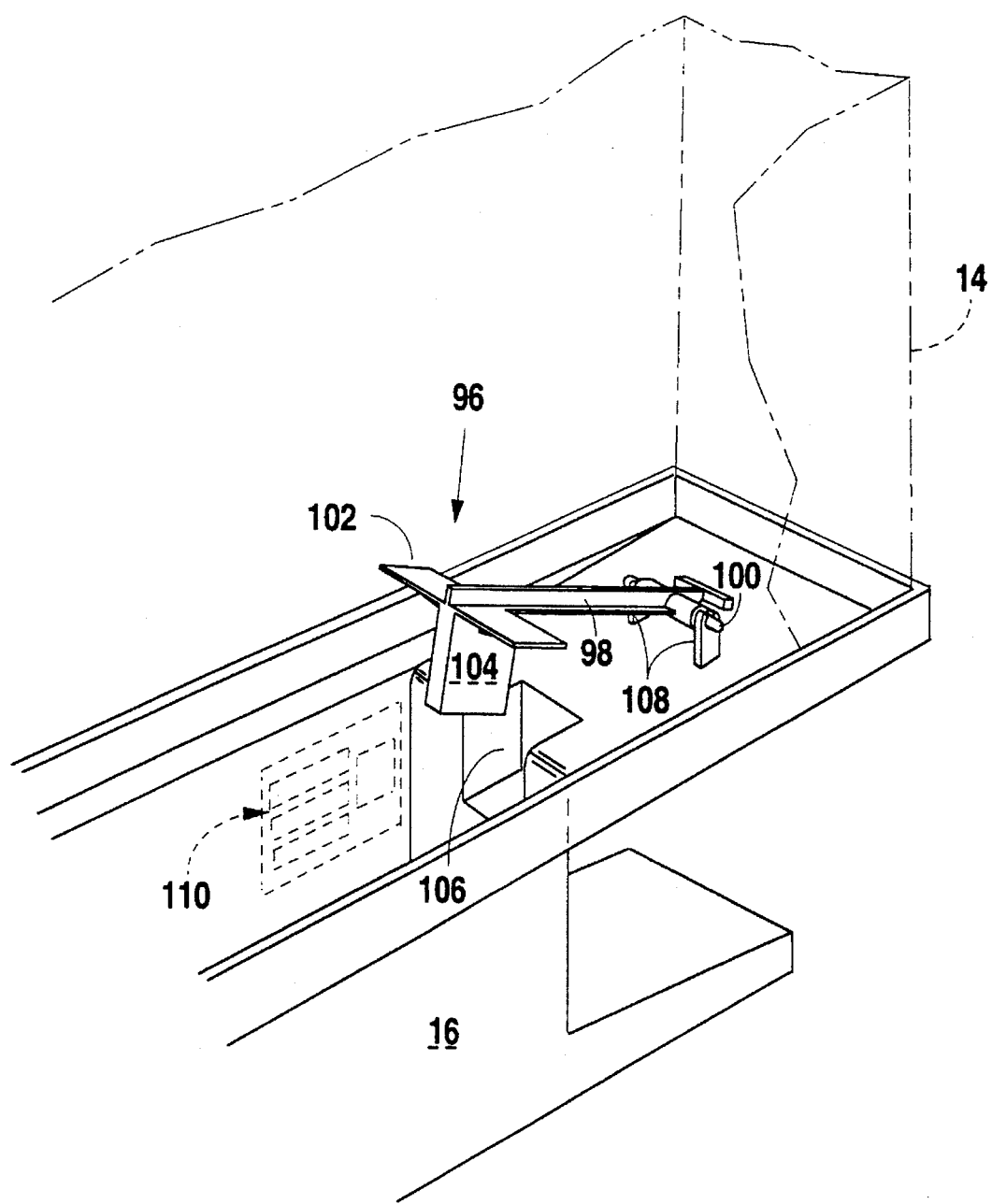
FIG. 9 is a partial perspective view showing the flag.

Referring to FIG. 10, the attaching edge 30 includes a peripheral groove 42, a locking bead 44 and a plurality of sealing beads 46. The connecting edge 24 includes a peripheral tongue 48 that matingly fits in said groove 42 with a liquid-tight seal. A bead 43 of sealant is preferably located in the groove 42 to assist in making a liquid-tight seal.

A progressive cavity pump 50 (or moineau pump) is located in the pump chamber 28 in the pump housing 16. The pump 50 includes a rotor 54 and a stator 56. The stator includes a flexible bellows 58 at its distal end to allow the stator to move radially. A stop 60 abuts the proximal end of the stator to prevent axial movement thereof. The rotor 54 includes a drive shaft 62 extending exteriorily of the pump housing for connection to a drive motor through a liquid-tight seal 64. The pump housing includes a concentrate outlet opening 65.

The mixing nozzle 13 includes a nozzle housing 66 rotatably connected to the pump housing 16 and enclosing a mixing chamber 68, a concentrate passageway 70 leading from a concentrate inlet opening 72 to a concentrate inlet port 73 into said mixing chamber, a water inlet opening 74, a water passageway leading from said water inlet opening 74 into said mixing chamber, and a beverage discharge spout 78. The mixing chamber 68 includes a mixing element 80 which is also a shut-off valve. The mixing aspect of element 80 operates as follows: the incoming concentrate from the pump is forced to spread out around the conical surface 82 and enter the mixing chamber through the narrow annular slot 84 where it is hit and sheared by water which is directed against the concave bottom of the element 80 and then spreads out toward the slot 84 where it violently hits and mixes with the concentrate. Preferably, a flange 86 extends radially into the chamber 68 below the slot to further agitate and mix the water and concentrate. This violent action fully mixes the two components and no unmixed solids (such as occur in orange juice with pulp) are found in the bottom of a dispensed cup of beverage. The element 80 is preferably made of foamed polyethylene to increase its buoyancy. The flanges 81 are preferably at an angle so that the water hitting the concave underside of the element 80 causes it to rotate. This dynamic movement of the element 80 further assists the dynamic mixing.

The valve aspect of the mixing element 80 is that it floats in the single strength juice in the mixing chamber when the dispenser is off, and seals against a valve seat 88 to prevent any concentrate from flowing into the mixing chamber. When a drink is to be dispensed, the element 80 is pushed down by the flow of concentrate from the pump, thus opening the valve.

The container housing is rectangular in horizontal cross-section with two long side walls and two short side walls. The container housing tends to bulge outwardly in the middle due to the weight of the juice concentrate and the thinness of the housing walls. It is preferred to include a stiffening rib 90 inside the housing 14 to prevent such bulging. The rib 90 is a separate member that is slid into a pair of grooves 92 and 94 that are preferably molded in place on the inside side walls of the long walls of the housing 14. The rib 90 can be welded in place or preferably held by a locking bead on the rib. One or more such ribs can be used, as desired. The upper portion of the rib 90, below the fill opening 20, does not extend all the way across the package, so as to avoid interfering with a fill tube; the rib 90 does extend all the way across the package toward the lower portion of the package.

An important aspect of the package of this invention is the inclusion of a low level indicator 95, so that the operator will know when the package is low and so the dispenser will know when it is empty, and for preventing further dispensing when it is empty. These features are accomplished by means of a movable float 96. The preferred float 96 is hingedly connected at one end thereof to the housing 12 and the other end is free to move (float) between an upper position, when the liquid level is at or above the float, and a lower position as the liquid level falls below the upper position. The float 96 includes an elongated arm 98, a hinge pin 100, a wing 102 for floating on the liquid surface, and a flag 104 that descends into a narrow pocket 106 as the float falls to its lowermost position. The flag is preferably formed with white pigment to increase its opacity to infrared radiation and is preferably about ⅜" thick. The float is preferably air-foamed polyethylene to increase its buoyancy. The dispenser will have an infrared transmitter and receiver on opposite sides of said trough to detect said flag. The flag is preferably attached to the hinge posts 108 on the top wall of the pump housing 16 prior to the housings 14 and 16 being connected together.

The package 10 preferably includes a product identification label 110 on the left side of the pump housing as shown in FIG. 1. It preferably includes a shiny surface with a series of one, two or three black lines.

The mixing nozzle 13 preferably can rotate about its connection to the package housing 12 so that the nozzle 13 can be rotated up during shipping and handling, to take up less room and prevent damage thereto, and can be rotated down just prior to insertion into a dispenser.

The package 10 preferably includes tamper evidence means such as a shrink wrap around the package. The housings are preferably injected molded of polyethylene.

While the preferred embodiment of this invention has been described above in detail, it is to be understood that variations and modifications can be made therein without departing from the spirit and scope of the present invention. For example, other shapes and sizes and numbers and locations of stiffening ribs can be used. Also other shapes and sizes and locations of the float can be used. It is preferred that the mixing nozzle be rotatable but this is not essential. The mixing element is preferably also the shut-off valve, but a separate valve can be used, so the mixing element need not necessarily be movable. Any type of flow meter can be used, although it is preferred to use a paddle wheel flow meter as described in U.S. Pat. No. 5,381,926. Other types of air vent valves can be used in the fill cap. The package is all recyclable; the rotor and housings are high density polyethylene, the diaphragm 38 is low density polyethylene and the stator is preferably a soft thermoplastic elastomer such as sold under the trade name Santoprene.

What is claimed is:

1. A juice concentrate package for insertion into a postmix juice dispenser comprising:

(a) a package housing enclosing a concentrate chamber;

(b) said package housing including an upper container housing;

(c) said package housing including a lower pump housing;

(d) said container housing including an upper wall having a fill opening and side walls having a lower peripheral connecting edge surrounding a container housing bottom opening;

(e) said pump housing enclosing a pumping chamber and having a concentrate outlet opening and an upper peripheral attaching edge sized to mate with said connecting edge;

(f) said connecting edge being connected to said attaching edge in a liquid-tight seal;

(g) a fill plug installed in said fill opening with a liquid-tight seal, said fill plug including a one-way air vent valve that is normally closed to prevent liquid from escaping and that is adapted to open to allow air to enter into said container housing under reduced air pressure in said container housing occurring when concentrate has been pumped out;

(h) a progressive cavity pump including a rotor and a stator located in said pump chamber, a flexible bellows sealing the distal end of said stator to said pump housing adjacent said concentrate outlet opening, while allowing radial movement thereof, a stop connected to said pump housing and abutting a proximal end of said stator and preventing axial movement of said stator, said rotor including a drive shaft extending through a liquid-tight seal through said pump housing exteriorily of said pump housing; and (i) a mixing nozzle connected to said pump housing and having a mixing chamber, a concentrate passageway leading from a concentrate inlet opening to a concentrate inlet port into said mixing chamber, a water inlet opening, a water passageway leading from said water inlet opening into said mixing chamber, said mixing nozzle including a valve downstream from said concentrate inlet opening adapted to close for separating said mixing chamber from said concentrate passageway when said pump is not pumping and for opening during pumping, and means for spreading the flow of concentrate into said mixing chamber into a thin stream and for directing incoming water against said thin stream for a high degree of mixing.

2. The package as recited in claim 1 wherein said container housing is rectangular in horizontal cross-section and includes two short walls and two long walls and including a stiffening rib inside said container housing and connected between said long walls.

3. The package as recited in claim 1 including a movable float element inside of said package housing for indicating the level of concentrate in said container chamber.

4. The package as recited in claim 3 wherein said float element is elongated and is hingedly connected at one end to said container housing and the other end is adapted to move between an upper position when the concentrate level is at or above said upper position, and a lower position as said concentrate level falls below said upper position.

5. The package as recited in claim 4 wherein said element includes a flag and said package housing includes a pocket for receiving said flag when said element falls to said lower position.

6. The package as recited in claim 5 wherein said pocket is narrower than the width of said package housing.

7. The package as recited in claim 6 wherein said pump housing includes a top wall and said pocket is in a top wall of said pump housing.

8. The package as recited in claim 7 wherein said hinged connection is on said top wall of said pump housing.

9. The package as recited in claim 1 including a label on an exterior wall of said package housing, said label including a reflective portion and a non-reflective portion.

10. The package as recited in claim 9 wherein said reflective portion is closer to the rear portion of said package housing than said non-reflective portion.

11. The package as recited in claim 1 wherein said fill plug is welded to said fill opening.

12. The package as recited in claim 1 wherein said fill plug is snap-fitted into said fill opening.

13. The package as recited in claim 1 including means for rotatably connecting said mixing nozzle to said pump housing whereby said mixing nozzle can extend upwardly for shipping and downwardly for operation.

14. The package as recited in claim 1 including tamper evidence means on the exterior of said package housing.

15. The package as recited in claim 1 wherein said housings are injected molded of polyethylene.

16. The package as recited in claim 15 wherein said element is gas-filled polyethylene.

17. The package as recited in claim 16 wherein said rotor is made of high density polyethylene and said stator is made of soft thermoplastic elastomer.

18. The package as recited in claim 1 wherein said attaching edge includes a groove and sealing beads and said connecting edge includes a tongue matingly fitting in said groove.

19. The package as recited in claim 18 wherein said groove includes a locking flange for holding said rib in said groove.

20. The package as recited in claim 1 wherein said spreading means is a mixing element located at said concentrate inlet port into said mixing chamber.

21. The package as recited in claim 20 wherein said element is free to move and floats up to seal said inlet port when said pump is turned off.

* * * * *